Aug. 18, 1936.　　　J. D. CHALFANT　　　2,051,327
LENS
Filed June 13, 1934　　　2 Sheets-Sheet 1
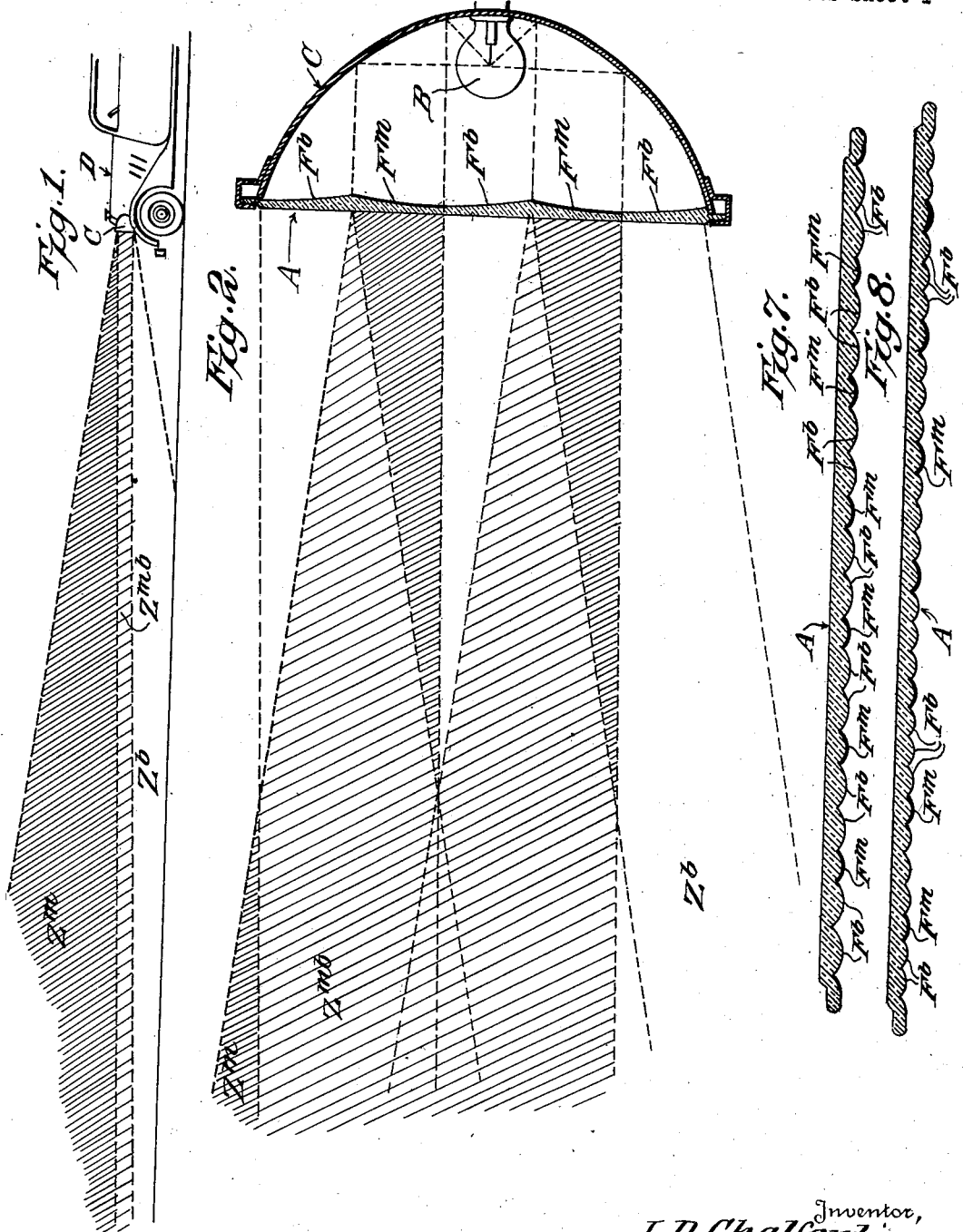

Aug. 18, 1936.   J. D. CHALFANT   2,051,327
LENS
Filed June 13, 1934   2 Sheets-Sheet 2
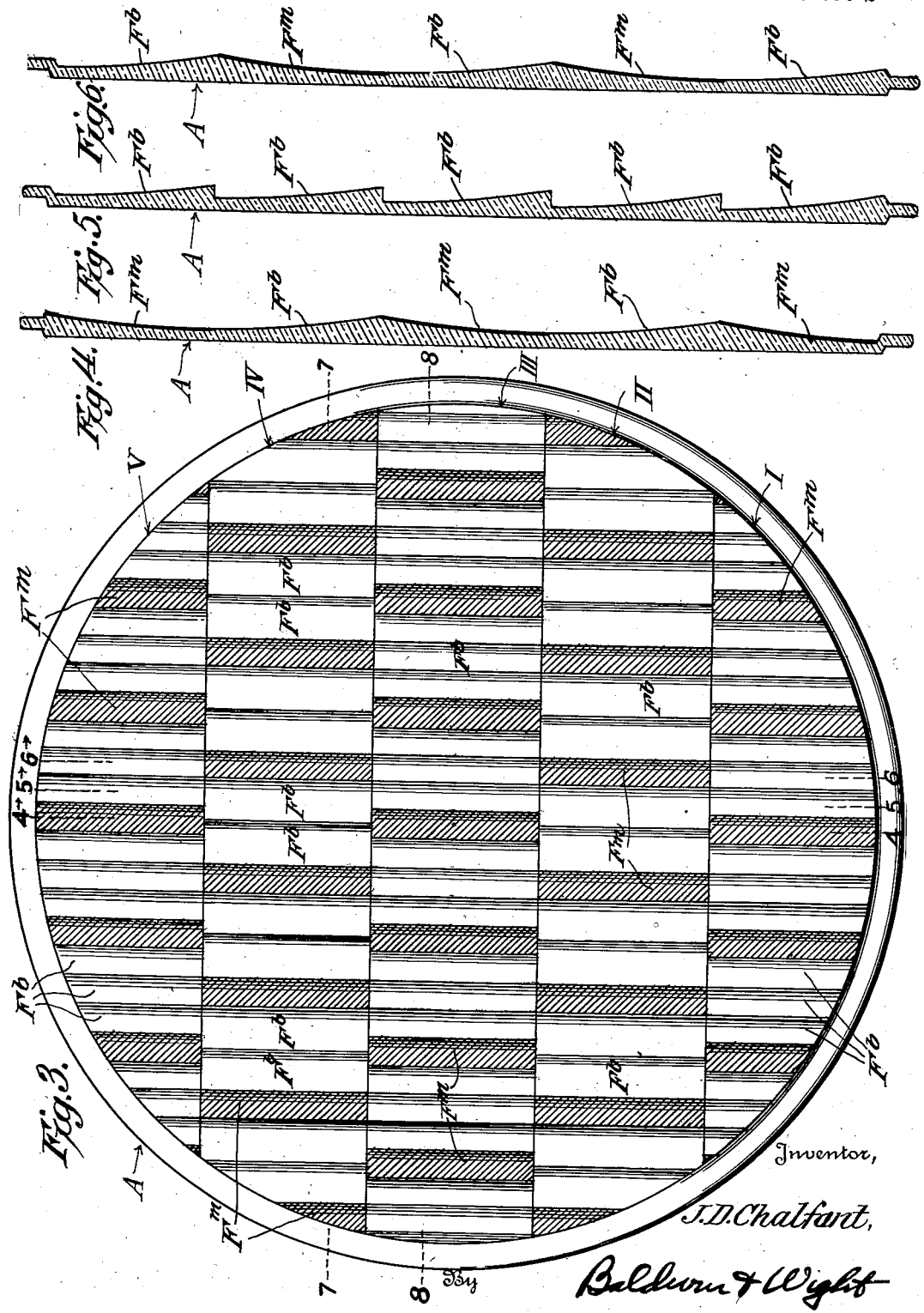

Patented Aug. 18, 1936

2,051,327

UNITED STATES PATENT OFFICE 2,051,327

LENS

Jefferson D. Chalfant, Ashley, Del.

Application June 13, 1934, Serial No. 730,497

8 Claims. (Cl. 240—41.4)

This invention relates to lenses and more particularly to anti-glare lenses especially adapted for use in vehicle headlights.

It is well known that the glare from headlights of automobiles and other vehicles is a source of considerable annoyance to the drivers of approaching vehicles and moreover is responsible for a large number of accidents which are directly attributable to blinding of an approaching driver. Various attempts have been made to provide lenses which will modify the light in such a way as to overcome this difficulty, but in most prior lenses modification of the light to any appreciable extent has been accomplished at the expense of decreased road illumination. Under modern driving conditions, i. e., good roads and high speeds, ample road illumination is probably as necessary to safety as is the avoiding of blinding the approaching drivers.

An object of the present invention is to provide an improved anti-glare lens which when used in conjunction with a source of light and suitable reflector, conventional or otherwise, will produce a beam of road-focused, highly illuminating light, and a non-glaring beam of soft light projected into the space above the road-focused light, the arrangement being such as to cause the entire surface of the lens to have a soft appearance, as, for example, the appearance of green light, when viewed from a distance.

In accordance with my invention, the lens may comprise a multiplicity of individual surfaces each of which is disposed generally in a plane different from the general plane of the lens considered as a whole, some of these surfaces being clear or relatively transparent and arranged to direct brilliantly illuminating light upon the roadway, and others of which are modified or relatively opaque as by being colored green and so arranged as to direct modified, e. g., green, light into the zone above the brilliant light, all of the facets being arranged in a novel pattern capable of causing the entire lens to have a softly illuminating appearance when viewed from a distance.

Other and more specific objects will become apparent from a reading of the following description, the appended claims, and the accompanying drawings in which:

Figure 1 is a diagrammatic side view showing graphically the relative positions of zones of brilliant light and modified light issuing from a lens in accordance with the invention;

Figure 2 is a vertical sectional view through a headlight equipped with my improved lens and showing graphically the relative positions of zones of brilliant light and non-glaring light as dispersed by the facets on line 6—6 of Figure 3;

Figure 3 is a rear elevation of a lens embodying the invention as viewed from the rear or light-entering side thereof;

Figure 4 is a section taken on the line 4—4 of Figure 3;

Figure 5 is a section taken on the line 5—5 of Figure 3;

Figure 6 is a section taken on the line 6—6 of Figure 3;

Figure 7 is a section taken on the line 7—7 of Figure 3; and

Figure 8 is a section taken on the line 8—8 of Figure 3.

The invention may be embodied in various forms but for the purpose of illustration there is shown a one-piece glass lens A adapted to be mounted conventionally in combination with a source of light B and a reflector C, the assembly being shown as being mounted upon an automobile D.

The lens shown includes a plurality of superposed horizontally extending rows I, II, III, IV, and V of vertically extending individual surfaces or refracting portions of different kinds arranged in a novel pattern and adapted to produce the distribution of bright light and modified light described above. Each row includes a plurality of spaced relatively opaque surfaces $F^m$ adapted to direct non-glaring light upwardly and forwardly into a zone $Z^m$ in front of the lens and above a predetermined level, and intervening relatively transparent surfaces $F^b$ adapted to direct bright light downwardly and forwardly into or towards a zone $Z^b$ in front of the lens and below said predetermined level. In vertical cross-section, the surfaces $F^b$ are slightly arcuate, but in general are inclined downwardly and rearwardly towards the reflector, whereas the surfaces $F^m$, though slightly curved or arcuate, in general are inclined upwardly and rearwardly towards the reflector.

In order to obtain the best results, it is desirable that there be an intermingling or merging of the modified and the bright light emanating from the surfaces $F^m$ and $F^b$, respectively, between the zones $Z^m$ and $Z^b$. This may be accomplished by disposing the surfaces as shown in the drawings in which the surfaces $F^m$ of one row, for example, the row I, are staggered with respect to the surfaces $F^m$ in the adjoining row, for example, the row II. In the rows I, III, and V there are three relatively narrow surfaces F^b intervening between adjacent surfaces F^m whereas in the rows II and IV there are two relatively wide surfaces F^b intervening between adjacent surfaces F^m. Each of the surfaces F^m is disposed midway between adjacent surfaces F^m in the adjoining row.

The surfaces F^m may be made capable of transmitting modified or non-glaring light in any suitable or convenient manner. In the form now preferred and shown in the drawings, these surfaces comprise or are provided with a green translucent coating, but it will be understood that other surface treatments may be resorted to if desired. The modified surfaces may be frosted, or they may be colored other than green, as blue or amber for examples. Preferably the surfaces are convex in horizontal cross-section on the rear side of the lens, this arrangement having been found to produce the most satisfactory results.

In the lens described above the clear surfaces F^b constitute about three-fourths of the entire lens surface and the green surfaces F^m about one-fourth thereof. With the described arrangement of surfaces the greater part of the bright light is focused upon the road whereas the greater part of the green or otherwise modified light is directed above the road. Between the zones Z^m and Z^b rays of modified or green light will intersect and mingle with rays of bright light, resulting in a beam of mixed modified and bright light Z^{mb}. The road-focused white light in the zone Z^b absorbs nearly all of the modified light which may stray into this zone, and the modified light preponderating in the zone Z^m substantially neutralizes the glaring effect of bright light straying into that zone. The net result is an effective brilliant illumination of the roadway without any substantial glare being produced at the level of the eyes of the driver of an approaching vehicle.

The lens shown and described herein embodies the invention in a practical and the at present preferred form, but it will be understood that various changes may be made in the specific construction without departing from the invention as defined in the claims.

I claim:

1. An anti-glare lens comprising a plurality of superposed rows of vertically extending individual surfaces each of which is disposed generally in a plane different from and at an angle to the general plane of the lens considered as a whole, the surfaces in each row lying in planes different from the planes in which surfaces in other rows lie, certain of said rows including spaced relatively opaque upwardly and rearwardly inclined surfaces adapted to transmit non-glaring light and a plurality of relatively transparent downwardly and rearwardly inclined surfaces adapted to transmit bright light interposed between each pair of adjacent relatively opaque surfaces.

2. An anti-glare lens comprising a plurality of superposed rows of vertically extending individual surfaces each of which is disposed generally in a plane different from and at an angle to the general plane of the lens considered as a whole, the surfaces in each row lying in planes different from the planes in which surfaces in other rows lie, certain of said rows including spaced relatively opaque surfaces adapted to transmit non-glaring light and a plurality of relatively transparent surfaces adapted to transmit bright light interposed between each pair of adjacent relatively opaque surfaces, the relatively opaque surfaces in each row being staggered with respect to those in the next row.

3. An anti-glare lens comprising a plurality of superposed rows of vertically extending individual surfaces each of which is disposed generally in a plane different from and at an angle to the general plane of the lens considered as a whole, the surfaces in each row lying in planes different from the planes in which surfaces in other rows lie, each of said rows including a plurality of spaced upwardly and rearwardly inclined green surfaces and a plurality of downwardly and rearwardly inclined clear surfaces interposed between each pair of adjacent green surfaces.

4. An anti-glare lens comprising a plurality of superposed rows of vertically extending individual surfaces each of which is disposed generally in a plane different from and at an angle to the general plane of the lens considered as a whole, the surfaces in each row lying in planes different from the planes in which surfaces in other rows lie, certain of said rows including spaced relatively opaque surfaces adapted to transmit non-glaring light and a plurality of relatively transparent surfaces adapted to transmit bright light interposed between each pair of adjacent relatively opaque surfaces, the total surface area of the relatively translucent surfaces being about three times the total surface area of the relatively opaque surfaces, and the relatively opaque surfaces of each row being disposed midway between adjacent relatively opaque surfaces in the next row.

5. An anti-glare lens as set forth in claim 1 in which the individual surfaces are convex in horizontal cross-section.

6. A lens as set forth in claim 1 in which the total surface area of the relatively transparent surface is greater than the total surface area of the relatively opaque surfaces.

7. An anti-glare lens comprising a plurality of superposed rows of vertically extending individual surfaces each of which is disposed generally in a plane different from the general plane of the lens considered as a whole, certain of said rows including spaced relatively opaque surfaces adapted to transmit non-glaring light and a plurality of relatively transparent surfaces adapted to transmit bright light interposed between each pair of adjacent relatively opaque surfaces, the relatively opaque surfaces in vertical cross section being slightly curved or arcuate and inclined upwardly and rearwardly, and the relatively transparent surfaces in vertical cross section being slightly curved or arcuate and inclined downwardly and rearwardly.

8. An anti-glare lens including in vertical cross section a plurality of relatively transparent individual surfaces and relatively opaque individual surfaces each of which is disposed generally in a plane different from the plane of the lens considered as a whole, faces of the relatively transparent surfaces being arcuate in vertical cross section and being inclined downwardly and rearwardly towards the light entrance side and the faces of the relatively opaque surfaces being arcuate in vertical cross section and being inclined upwardly and rearwardly towards the light entrance side.

JEFFERSON D. CHALFANT.